(12) United States Patent
Schuster (10) Patent No.: US 9,945,675 B2
(45) Date of Patent: Apr. 17, 2018

(54) GUIDING USERS IN AN AREA

(71) Applicant: Inventio AG, Hergiswil (CH)

(72) Inventor: Kilian Schuster, Emmenbrücke (CH)

(73) Assignee: INVENTIO AG, Hergiswil (CH)

( * ) Notice: Subject to any disclaimer, the term of this patent is extended or adjusted under 35 U.S.C. 154(b) by 12 days.

(21) Appl. No.: 14/422,011

(22) PCT Filed: Jul. 19, 2013

(86) PCT No.: PCT/EP2013/065305
§ 371 (c)(1),
(2) Date: Feb. 17, 2015

(87) PCT Pub. No.: WO2014/032855
PCT Pub. Date: Mar. 6, 2014

(65) Prior Publication Data
US 2015/0204678 A1    Jul. 23, 2015

(30) Foreign Application Priority Data

Aug. 31, 2012 (EP) ................... 12182608

(51) Int. Cl.
| | |
|---|---|
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *G01C 21/20* | (2006.01) |
| *B66B 1/46* | (2006.01) |
| *G01C 21/36* | (2006.01) |
| *G07C 9/00* | (2006.01) |
| *B66B 3/00* | (2006.01) |

(52) U.S. Cl.
CPC ............ *G01C 21/206* (2013.01); *B66B 1/468* (2013.01); *B66B 3/006* (2013.01); *G01C 21/3623* (2013.01); *G07C 9/00111* (2013.01)

(58) Field of Classification Search
CPC . B66B 1/468; G07C 9/00111; G01C 21/3623; G01C 21/206
USPC ........................................................ 701/522
See application file for complete search history.

(56) References Cited

U.S. PATENT DOCUMENTS

| | | |
|---|---|---|
| 2006/0188230 A1 | 8/2006 | An |
| 2007/0026802 A1 | 2/2007 | Gerstenkorn |
| 2009/0014516 A1 | 1/2009 | Kshirsagar et al. |
| 2009/0022131 A1* | 1/2009 | Rusanen ................ B66B 1/468 370/338 |

(Continued)

FOREIGN PATENT DOCUMENTS

WO    2007093665 A1    8/2007

*Primary Examiner* — Maceeh Anwari
(74) *Attorney, Agent, or Firm* — William J. Clemens; Shumaker, Loop & Kendrick, LLP (57) ABSTRACT

A user can use a portable electronic device to read destination information at a starting location. The portable electronic device can be, for example, a smartphone. The destination information can be read from a tag located at the starting location. The user can then present the portable electronic device to a reader, which reads the destination information from the device. In response to reading the destination information from the device, various actions can be performed to aid the user. For example, an elevator call can be placed, trip information can be provided to the user, and/or another action can be performed.

18 Claims, 9 Drawing Sheets

(56) References Cited

U.S. PATENT DOCUMENTS

2012/0130635 A1\* 5/2012 Nakamura ........... G01C 21/206
                                                                              701/465

\* cited by examiner

GUIDING USERS IN AN AREA

FIELD

The present disclosure relates to guiding a user in an area, for example, in a building.

BACKGROUND

When a user visits a location (e.g., a building), directions provided by a machine can help the user reach a given destination. Navigation devices relying on satellite data (e.g., Global Positioning System (GPS) devices) are sometimes not effective in locations where an adequate satellite signal cannot be easily received, including underground locations or locations in a building.

US20090014516A1 describes a system where a visitor is given an access card that is encoded for a specific route to a room in a building. The access card allows access to doors en route to the room. The card can be read by a card reader, which can show maps and give the visitor directions.

SUMMARY

A user can use a portable electronic device to read destination information at a starting location. The portable electronic device can comprise, for example, a smartphone. The destination information can be read from a tag located at the starting location. The user can then present the portable electronic device to a reader, which reads the destination information from the device. In response to reading the destination information from the device, various actions can be performed to aid the user. For example, an elevator call can be placed, trip information can be provided to the user, a door can be unlocked, and/or another action can be performed.

In some embodiments, a user guidance method comprises reading destination information for a destination from a tag at a starting area using a portable electronic device, and then presenting the portable electronic device to a reader, the portable electronic device being configured to transmit the destination information to the reader.

In further embodiments, a user guidance method comprises: reading, from a portable electronic device and using a reader, destination information for a destination, the destination information having been read by the portable electronic device from a tag at a starting area; and determining a route for the destination from a location of the reader.

The portable electronic device can comprise a near-field communication device. The user guidance method can further comprise sending a command to a guidance computer based on the route, and the method can also further comprise sending a command to an access control system based on the route. The user guidance method can also comprise sending a command to an elevator system control based on the route.

Embodiments of a user guidance system can comprise a tag storing destination information for a destination, the tag being located in a starting area, and a reader configured to read the destination information from a portable electronic device. The user guidance system can further comprise an elevator control system coupled to the reader, the reader comprising a destination call terminal or a guidance computer. In some cases, the tag is a first tag and the destination is a first destination, the system further comprising a second tag storing destination information for a second destination. The tag can be fixed to a wall or other surface at the starting area. The tag can comprise a radio tag or an optical code. The destination information can include a relative destination.

Further embodiments comprise a computer-based device configured to perform one or more of the disclosed methods.

At least some embodiments of the disclosed methods can be implemented using a computer or computer-based device that performs one or more method acts, the computer or computer-based device having read instructions for performing the method acts from one or more computer-readable storage media. The computer-readable storage media can comprise, for example, one or more optical disks, volatile memory components (such as DRAM or SRAM) and/or nonvolatile memory components (such as hard drives, Flash RAM or ROM). The computer-readable storage media do not cover pure transitory signals. The methods disclosed herein are not performed solely in the human mind.

DETAILED DESCRIPTION

Figure 1:
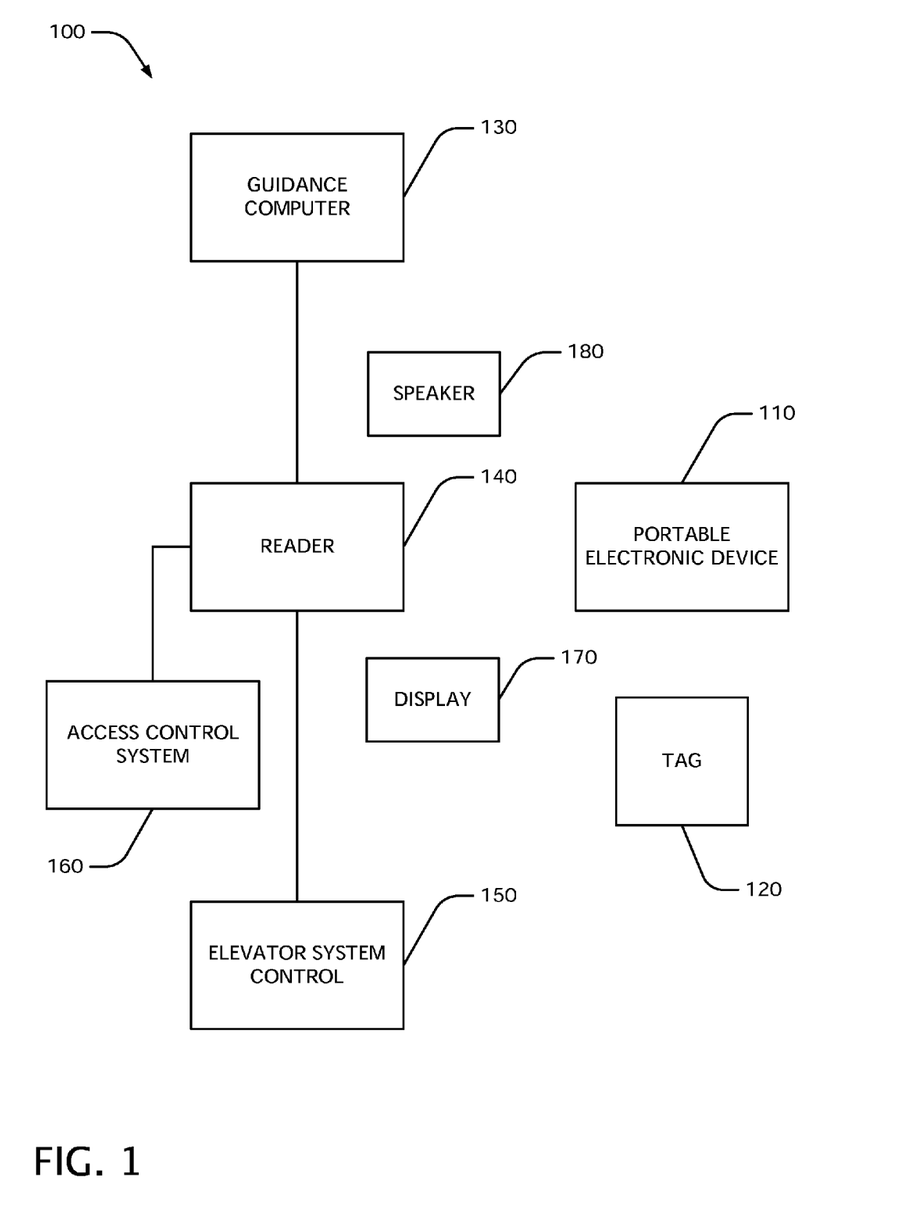
FIG. 1 shows a block diagram of an exemplary embodiment of a user guidance system.

FIG. 1 shows a block diagram of an exemplary embodiment of a user guidance system 100. The system 100 comprises one or more tags 120, which store information about various locations (examples of such tags are described below in more detail). The system 100 also comprises a reader 140 for reading information from a portable electronic device 110. In some embodiments, the reader 140 is coupled to an elevator system control 150 and/or to a guidance computer 130. The reader 140 can also be coupled to an access control system 160. The elevator system control 150 controls one or more functions of an elevator installation. The guidance computer 130 can provide directions for a user and information about the user's environment. The access control system 160 can, for example, lock and unlock doors or other components. The portable electronic device 110 can comprise, for example, a handheld computer, a smartphone, a mobile telephone, a tablet computer, a laptop computer and a PDA (personal digital assistant). In some embodiments, the device 110 has NFC (near-field communication) capabilities.

In further embodiments, the reader 140 can be coupled to one or more output devices, for example, a display 170 and/or a speaker 180. Such devices can allow the reader 140 to convey information to a user. One or more displays 170 and/or speakers 180 can also be coupled to other components, such as the guidance computer 130, the elevator system 150 and the access control system 160.

Any of the reader 140, the guidance computer 130, the elevator system control 150 and the access control system 160 can be computer-based. Also, any of these components can comprise a single component or multiple components acting together.

Some of the disclosed embodiments are described in the context of an elevator installation, often in the context of an elevator installation that uses destination call control. Destination call control allows the destination floor of a passenger to be determined before the passenger enters the elevator car. At least some of the disclosed embodiments can also be used with non-destination-call-control elevator systems (e.g., systems where a user indicates a destination floor from within the elevator car).

Figure 2:
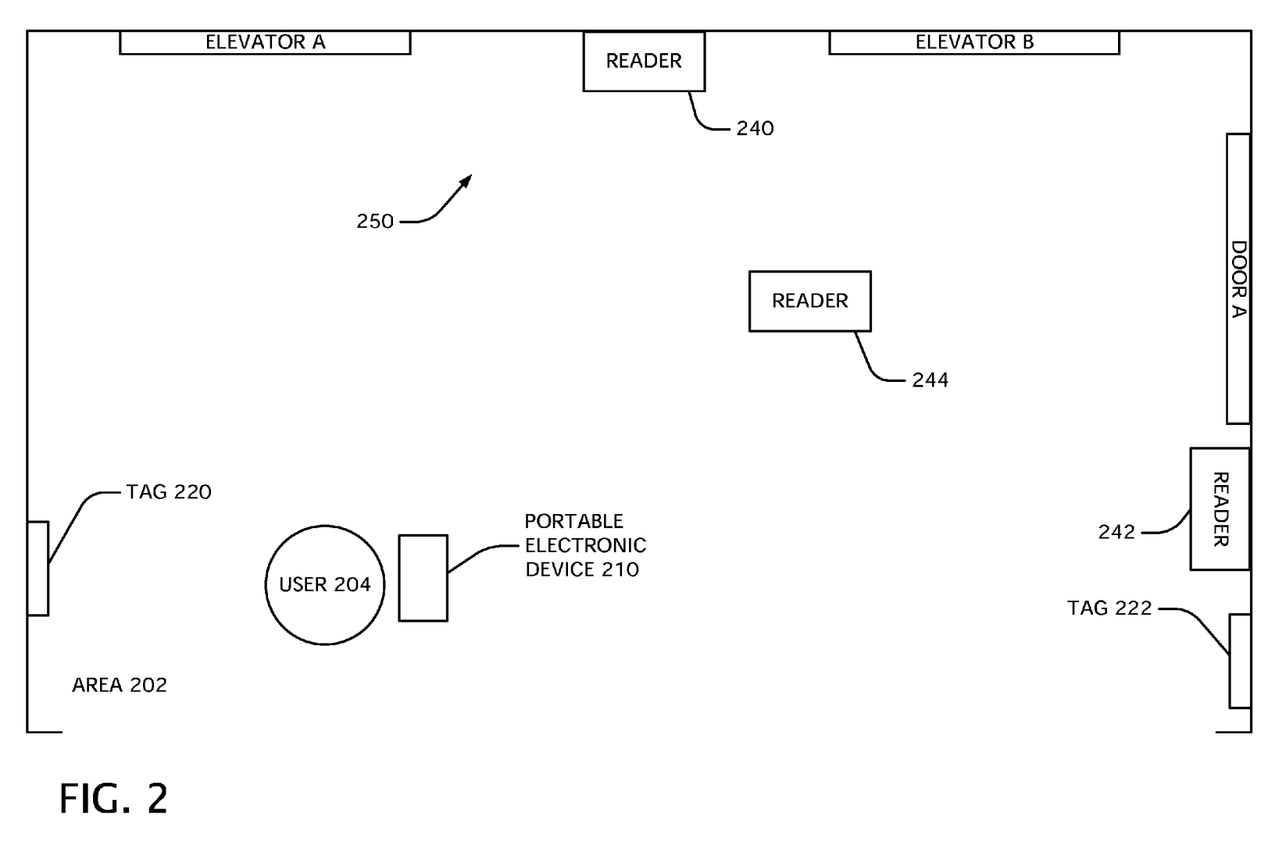
FIG. 2 shows a plan view of an exemplary embodiment of a setting for a user guidance system.

FIG. 2 shows a block-diagram plan view of an exemplary setting for using at least some embodiments of the disclosed technologies. An area 202 is at least partially accessible to a user 204 (including, possibly, multiple users). The user 204 may or may not be familiar with the area 202 and its surroundings. The area 202 can be in, at or near a building or other structure. For example, in various embodiments the area 202 can be a lobby in a building or parking garage, a subterranean area or structure, or an outdoor entrance area. In some cases, the user 204 needs authorization to enter the area 202.

In various embodiments, the area 202 provides access to one or more elevators, escalators, staircases, hallways, storage areas and/or doors, which can allow the user 204 to reach one or more other areas. For example, in the setting of FIG. 2 the area 202 offers possible access to elevator A, elevator B and door A. In this example, an elevator installation 250 comprises elevators A and B. The area 202 comprises one or more tags 220, 222. Generally, the tags 220, 222 can be read by a portable electronic device 210 used by the user 204. One or more readers 240, 242, 244 can be positioned in the area 202.

Figure 3:
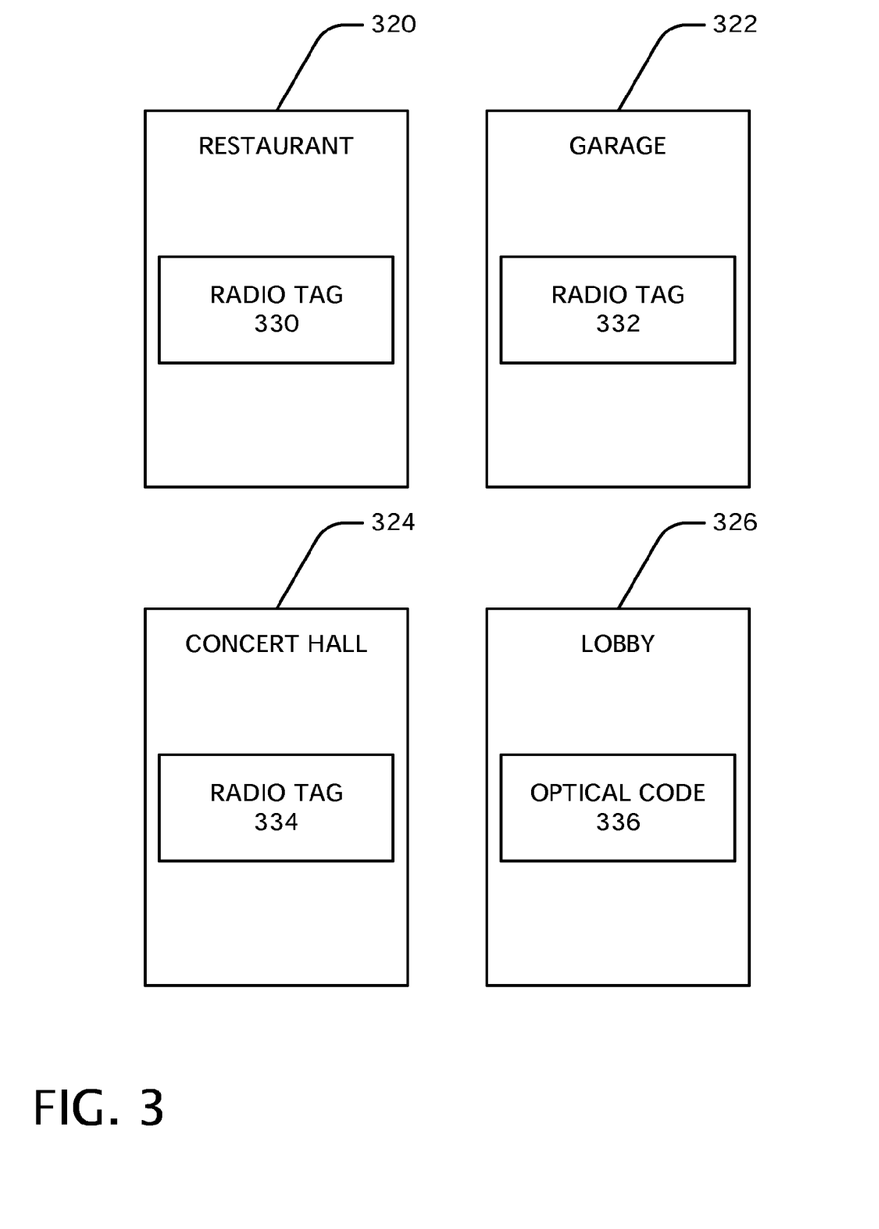
FIG. 3 shows a block diagram of exemplary embodiments of tags containing destination information.

FIG. 3 shows block diagrams of exemplary embodiments of tags 320, 322, 324, 326 containing destination information for various destinations. "Destination information" refers to information that identifies a particular location or type of location that a user may wish to reach. The destination information can allow the user guidance system to know the desired destination. The tag 320, for example, is labeled with the word "RESTAURANT" and comprises a radio tag 330 (e.g., an active or a passive radio frequency identification (RFID) tag) that stores the destination information for the restaurant. In various embodiments, the destination information can comprise, for example, a number, geographic coordinates, a text string and/or another type of information that the user guidance system can associate with a particular destination. The tag 322 comprises a radio tag 332 containing destination information for a garage, while the tag 324 comprises a radio tag 334 containing destination information for a concert hall.

In further embodiments, a tag stores machine-readable information using a technology other than a radio tag. For example, FIG. 3 shows a tag 326 labeled with the word "LOBBY" and comprising an optical code 336. The optical code 336 can comprise, for example, a one-dimensional optical code (such as a bar code), a two-dimensional optical code (such as a QR code), and/or another machine-readable image.

In additional embodiments, a tag can store destination information using one or more other machine-readable technologies.

In some cases, the tags 320, 322, 324 can be labeled with pictures, number, colors, icons, and/or touch-readable markings (e.g., Braille) in addition to, or instead of, word labels. In further embodiments, the tags are not labeled.

In some embodiments, a tag containing destination information is attached to a fixed surface. Returning to FIG. 2, the tags 220, 222 are depicted in this figure as being fixed to different walls of the area 202. In further embodiments, a tag can be fixed to another surface, for example, a floor, a ceiling, a door, a sign, a signpost and/or another type of surface. In further embodiments, the tag is not attached to a fixed surface, but is instead attached to a non-fixed surface, for example, a paper that is available at the area 202. The number of tags available in the area 202 can be, for example, 1 tag, 2 tags, 3 tags, 5 tags or another number of tags. Such an arrangement can allow a user to select destination information for a number of possible destinations.

Figure 4:
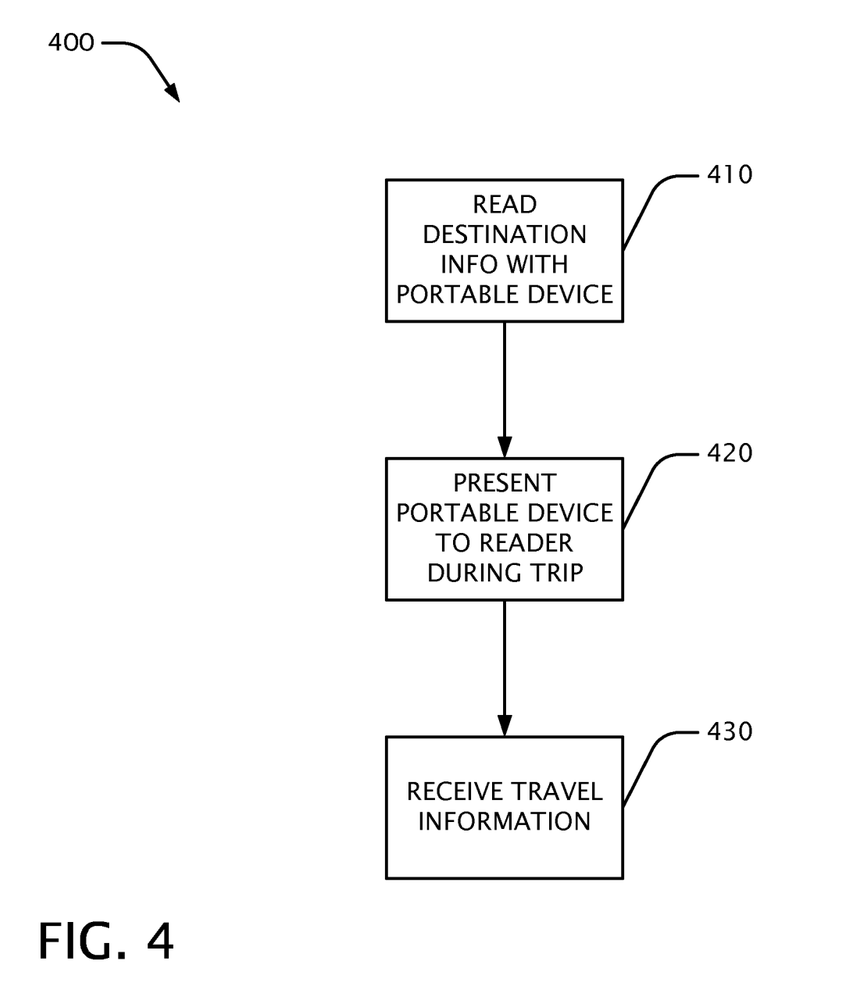
FIG. 4 shows a flow diagram of an exemplary embodiment of a method for user guidance.

FIG. 4 shows a flow diagram of an exemplary embodiment of a method 400 for user guidance. The method 400 can be performed using embodiments of systems such as those described above in any of FIGS. 1-3, or using another embodiment of a user guidance system. In a method step or act 410, a tag containing destination information is read using a portable electronic device. The tag is located at an area where the user starts a trip. As will be explained below in more detail below, the portable electronic device reads the destination information from the tag and then configures itself to transfer the destination information to a reader. Thus, in a method act 420, the portable electronic device can be presented to the reader while the user is going to the desired destination. For example, the user can present the portable electronic device 110, 210 to the reader 140, 240, 242, 244.

In some embodiments, the method 400 comprises a further method act 430, in which the user receives travel information after the portable electronic device is presented to the reader. The travel information can comprise, for example, a direction in which the user should move, an elevator assignment, a door which the user should pass through, and/or other information that guides the user to the user's destination. For example, a display coupled to the reader could show the phrase, "TURN LEFT AND WALK 50 METERS." Or, the display could show the phrase, "PLEASE ENTER ELEVATOR B." Or, the display could show the phrase, "PLEASE USE DOOR NUMBER 2." Such information can also be communicated by sound. Travel information can be determined by a guidance computer or another device.

Along with the travel information being communicated, corresponding instructions can be sent to appropriate systems. For example, in various embodiments, the reader can: instruct an elevator control system to serve a destination call for the user; instruct an access system to open a door or other barrier for the user; and/or instruct a guidance computer to determine a travel route for the user.

In particular embodiments, the user does not receive travel information in a method act 430. Instead, the user is allowed to pass through a door or other barrier as a result of presenting the portable device to the reader (e.g., the door is unlocked, the barrier is opened).

Depending on the user's journey and the configuration of the area through which the journey passes, a user can present the portable electronic device to more than one reader. For example, the user could present the device to a reader at an elevator destination call terminal to receive an appropriate elevator assignment. During the journey, the user could also present the device to a reader at a guidance computer, which then tells the user which direction to go next. The user could also present the device to a reader at a lock to be allowed to pass through a door.

Figure 5:
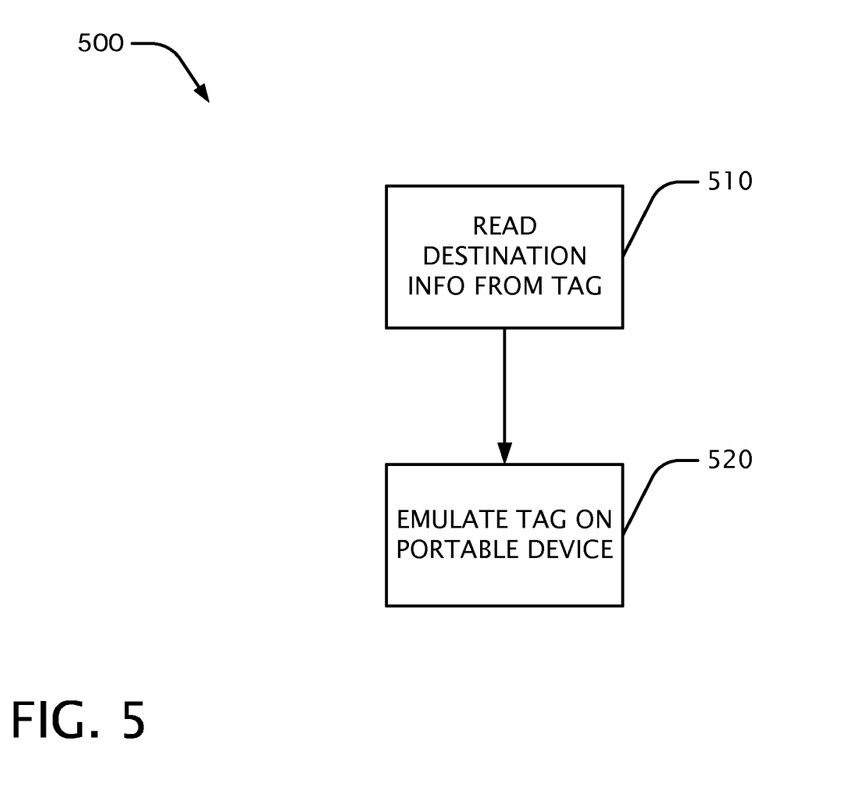
FIG. 5 shows a flow diagram of an exemplary embodiment of a method for operating a portable electronic device.

FIG. 5 shows a flow diagram of an exemplary embodiment of a method 500 for operating a portable electronic device, such as the devices 110, 210. In a method step or act 510, the device reads destination information from a tag (e.g., such as the tags 120, 220, 222, 320, 322, 324, 326). For example, if the device is an NFC device, the device can operate in card-reader mode to read the tag. In cases where the tag comprises an optical code, the device reads the destination information from the tag using, for example, a camera or optical code reader. In a method act 520, based on the read destination information, the device emulates the tag. In other words, the portable electronic device transmits at least some of the destination information to another device (e.g., a reader). For example, if the device is an NFC device, the device can operate in card-emulation mode. If the tag comprises an optical code, then the device can show a corresponding image on the device's display. Thus, a user can read destination information using the portable electronic device and then communicate the destination information to a reader during the journey. The method 500 can be performed using a software program on the portable electronic device.

Figure 6:
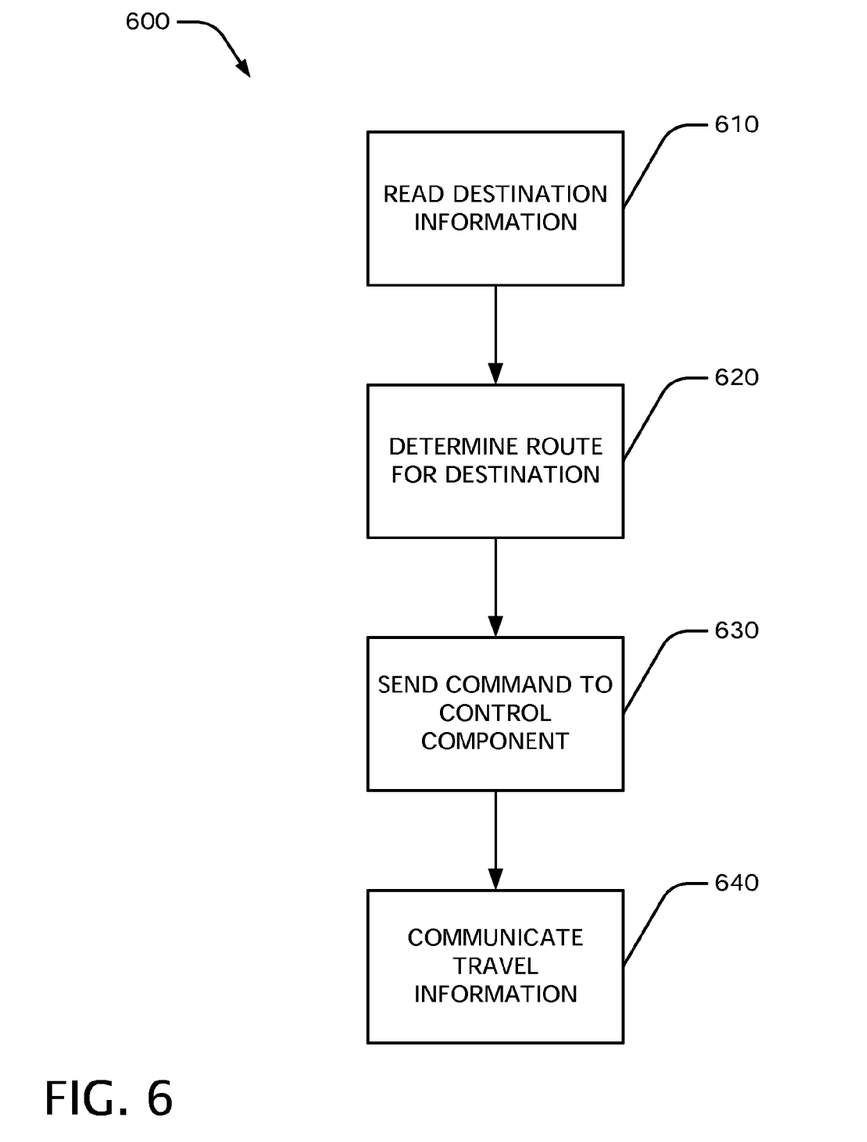
FIG. 6 shows a flow diagram of an exemplary embodiment of a method for operating a user guidance system.

FIG. 6 shows a flow diagram of an exemplary embodiment of a method 600 for operating a user guidance system. The method 600 can be used with systems such as, for example, those described above for FIGS. 1-3, or with other embodiments. In a method step or act 610, a reader reads destination information from a portable electronic device. In a method act 620, a route is determined between the location of the reader and the location indicated by the destination information. The route can be determined using, for example, a software program running on a guidance computer. According to the determined route, at least one command can be sent to at least one control component in a method act 630. The control component can be, for example, an elevator system control, a guidance computer, an access control system, a lock and/or another device. In a method act 640, the system communicates travel information to a user.

In further embodiments, only one of the method acts 630, 640 is performed.

In some cases, a user guidance system is programmed to provide travel information, place elevator calls, open doors or perform other actions only during certain time periods. For example, such actions may be performed only during business hours or during visiting hours for a building. Such time limitations can be the same for every destination served by a system, or the limitations can vary for different destinations. For example, guidance for a restaurant may be provided only in the evenings, when the restaurant is open, while guidance for an emergency medical clinic may be provided at all times. In some embodiments, different routes for a given destination are used, based on the current time period.

Figure 7:
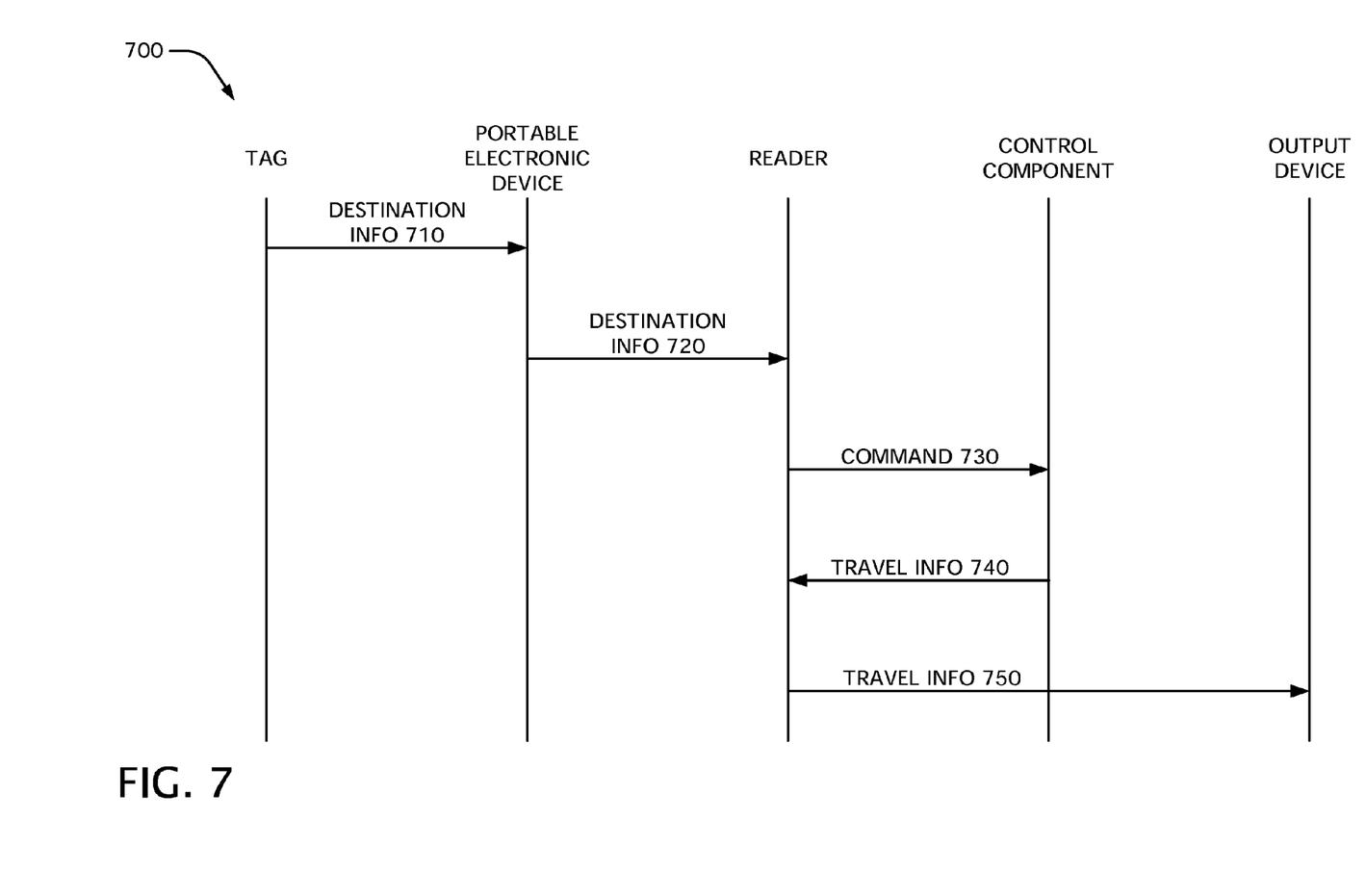
FIG. 7 shows a diagram describing an exemplary exchange of signals among components of a user guidance system.

FIG. 7 shows a signal diagram 700 describing an exemplary exchange of signals among components of one version of a user guidance system. In this example, a tag sends a signal 710 containing destination information to a portable electronic device (e.g., the portable electronic device reads the destination information from the tag). Then, the portable electronic device sends a signal 720 containing the destination information to a reader (e.g., the reader reads the destination information from the portable electronic device). Based on the received destination information, the reader sends a command 730 to an elevator system control unit, access control system and/or guidance computer (labeled a "control component" in FIG. 7). In some embodiments, where the command 730 is sent to a guidance computer, the guidance computer can return a signal 740 containing travel information for the user. The reader can also send a command 750 to an output device (e.g., to communicate travel information to a user).

In variations of any of the disclosed embodiments, the destination information is used as a reference by the reader and/or by another component. For example, instead of using the destination information to determine an absolute location (e.g., a particular room in a building), the reader can use the destination information to determine a relative location (e.g., a room on whatever floor the reader happens to be on). In some cases, information for the relative location is retrieved from another device (e.g., a local or remote server).

Figure 8:
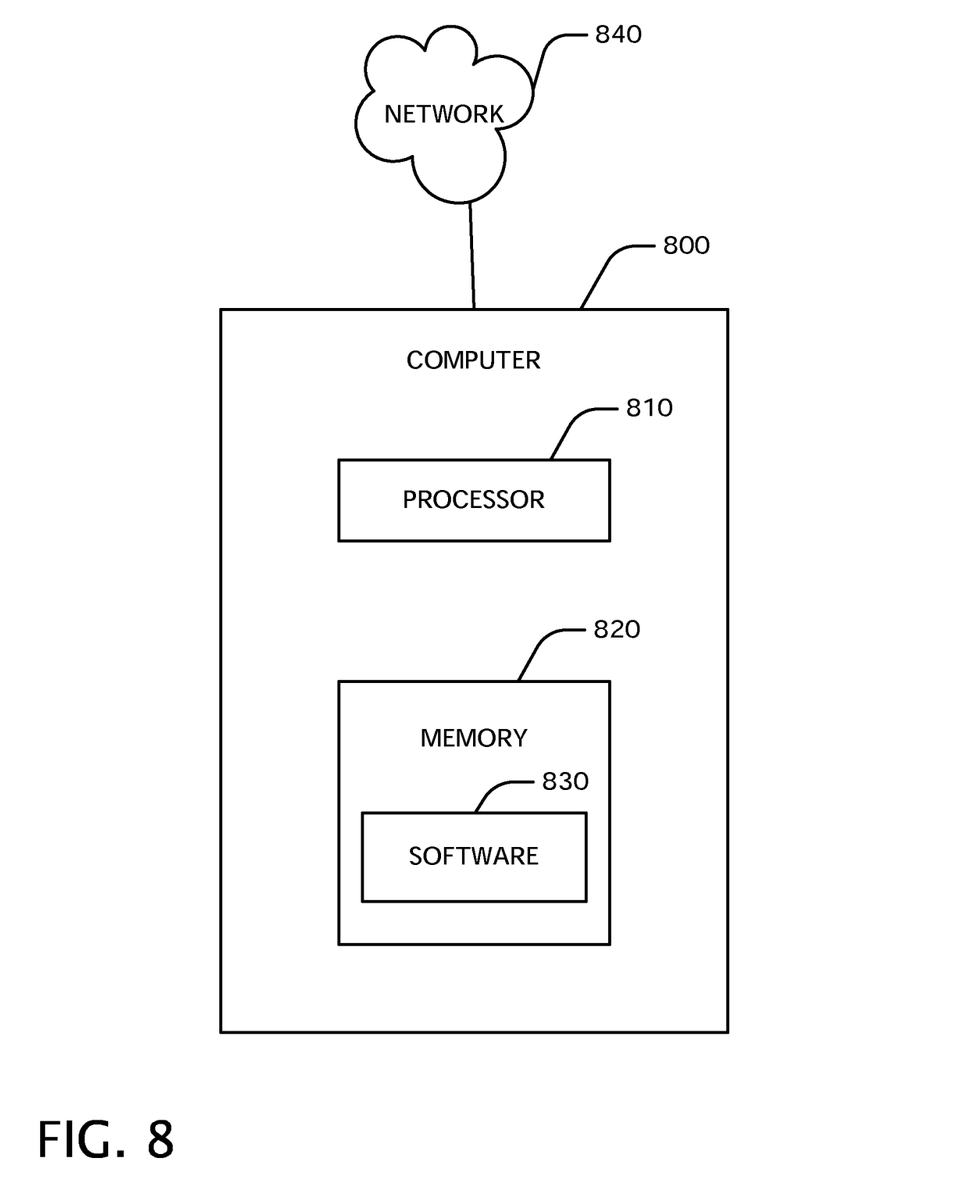
FIG. 8 shows a block diagram of an exemplary embodiment of a computer.

FIG. 8 shows a block diagram of an exemplary embodiment of a computer 800 (e.g., part of an elevator control system, part of a guidance computer, part of an access control system, part of an electronic lock, part of a reader) that can be used with one or more technologies disclosed herein. The computer 800 comprises one or more processors 810. The processor 810 is coupled to a memory 820, which comprises one or more computer-readable storage media storing software instructions 830. When executed by the processor 810, the software instructions 830 cause the processor 810 to perform one or more method acts disclosed herein. Further embodiments of the computer 800 can comprise one or more additional components. The computer 800 can be connected to one or more other computers or electronic devices through an input/output component (not shown). In at least some embodiments, the computer 800 can connect to other computers or electronic devices through a network 840. In particular embodiments, the computer 800 works with one or more other computers, which are located locally and/or remotely. One or more of the disclosed methods can thus be performed using a distributed computing system.

Figure 9:
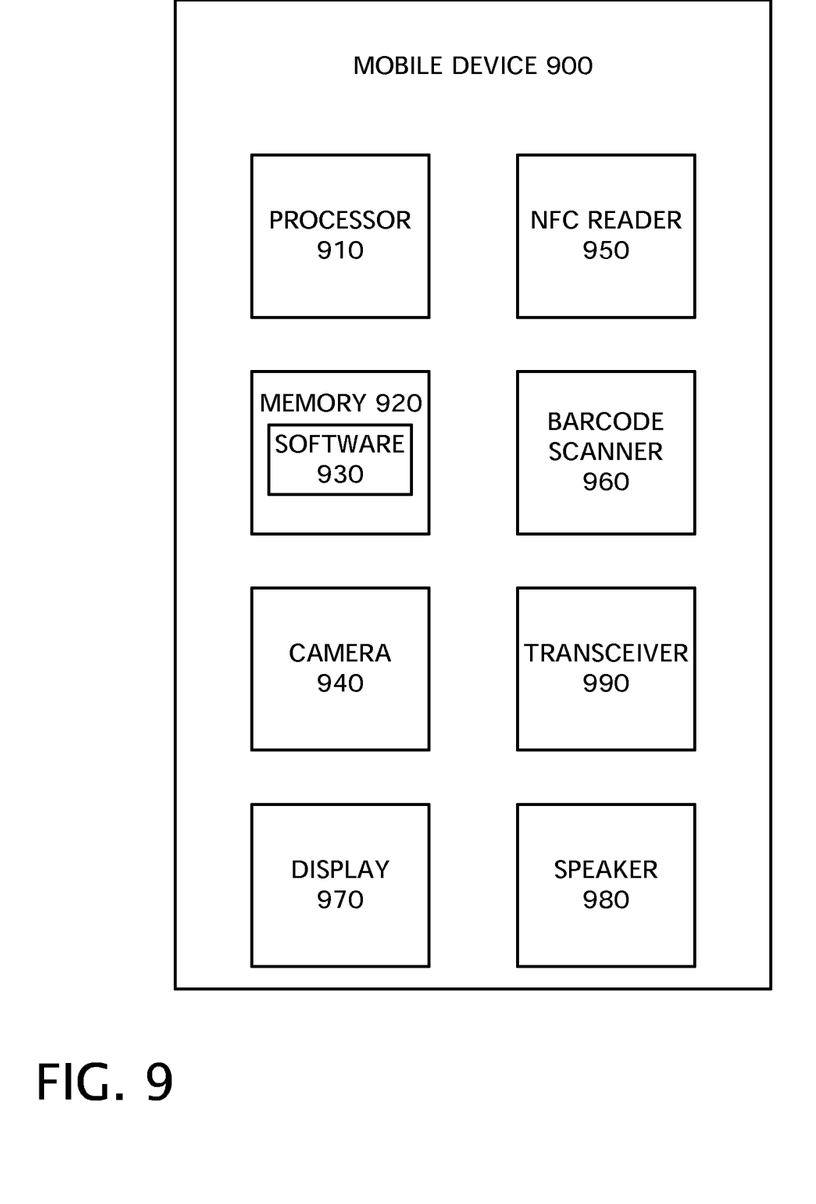
FIG. 9 shows a block diagram of an exemplary embodiment of a portable electronic device.

FIG. 9 shows a block diagram of an exemplary embodiment of a mobile device 900 that can be used with one or more technologies disclosed herein. The mobile device 900 comprises components such as a processor 910, The processor 910 is coupled to a memory 920, which comprises one or more computer-readable storage media storing software instructions 930. When executed by the processor 910, the software instructions 930 cause the processor 910 to perform one or more method acts disclosed herein. The software instructions 930 can be loaded onto the mobile device 900 through a connection with another electronic device (e.g., a personal computer), through a connection to one or more computer-readable storage media (e.g., through a data storage card) and/or through a network connection (e.g., over the Internet or a private network).

The mobile device 900 further comprises one or more input and/or output devices, such as a display 970 and an audio speaker 980. A transceiver 990 allows the device 900 to send and receive information with one or more networks (e.g., wireless networks, wired networks). The one or more networks can use various technologies, for example, wireless LAN, Bluetooth, UMTS, GSM, and/or others. The mobile device 900 can also comprise a camera 940, an NFC reader 950, and/or a barcode scanner 960.

Various embodiments of the mobile device 900 can omit one or more of the components shown in FIG. 9 and/or include additional components, including one or more further instances of any of the above components.

At least some of the disclosed embodiments can assist a user in navigating through an unfamiliar area, such as a building. If the portable electronic device is, for example, the user's cellular telephone or media player, then the user does not need to carry an additional item (e.g., an additional electronic device, or a card) for help in reaching a destination. Additionally, since the user can reach the desired destination without directions from a person, it is not necessary for a receptionist or other person to prepare a map or access device for the user. The user's portable electronic device also does not need a radio connection to a network, GPS satellite, or other system to allow the user to receive directions. In some cases, the user can personally choose from a number of possible destinations.

In one non-limiting example, a user enters the lobby of an unfamiliar building. On the wall is a directory of building occupants, along with tags containing destination information for various occupants. The user wishes to visit a doctor's office in the building. The user finds the tag for the doctor's office and reads destination information from the tag using an NFC-enabled smartphone, the smartphone functioning in reader mode. Then, the user approaches an elevator destination call terminal in the lobby and places the smartphone near a reader at the terminal. With the smartphone functioning in card-emulation mode, the reader reads the destination information from the smartphone. The reader passes the destination information to an elevator control system, which determines and places an appropriate elevator destination call based on the information, The elevator control system displays an elevator assignment to the user using a display near the destination call terminal. The user boards the assigned elevator and travels to the fifth floor. Upon arriving at the fifth floor, the user approaches a guidance computer in the fifth floor lobby and holds the smartphone near a reader on the computer. The guidance computer reads the destination information from the smartphone. Based on the destination information, the computer verbally instructs the user to proceed ten meters to the right down the hall. The user follows these instructions and arrives at the doctor's office.

In another non-limiting example, a user passes by an advertising sign that is positioned outside of a retail store. The user sees an item in the advertisement that the user would like to purchase from the store. Using a mobile telephone, the user reads an optical code that contains destination information for the location of the product within the store. A software program on the telephone causes the telephone to display the optical code, and the user then presents the optical code to one or more readers within the store. The readers then guide the user to the product that the user wishes to purchase.

In a further non-limiting example, a user in a lobby uses a mobile telephone to read destination information from a tag labeled "RESTROOM." The user then presents the telephone to a reader, which reads the destination information from the telephone. The reader recognizes that the destination information is a reference for a relative location, namely, the nearest available restroom. Based on information from a server in the building, the reader determines that the nearest restroom is currently being cleaned or is otherwise unavailable. Accordingly, the reader instructs a guidance computer to direct the user to another restroom in the area.

Although some embodiments of the various methods disclosed herein are described as comprising a certain number of method acts, further embodiments of a given method can comprise more or fewer method acts than are explicitly disclosed herein. In additional embodiments, method acts are performed in an order other than as disclosed herein. In some cases, two or more method acts can be combined into one method act and/or one method act can be divided into two or more method acts.

As used herein, a "user" can be a person, a group of persons, a machine and/or an animal.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A user guidance method, comprising the steps of:
reading, using a computer-based reader, destination information for a destination from a portable electronic device following presentation of the portable electronic device to the computer-based reader, the destination information having been read by the portable electronic device from a tag selected by a user at a starting area, the computer-based reader being separate from the portable electronic device, the destination information identifying as the destination a particular location or type of location that the user wishes to reach;
determining, using a guidance computer, a route for the destination from a location of the computer-based reader; and
providing directions to a user using the guidance computer to enable the user to follow the route, the guidance computer being separate from the portable electronic device.

2. The user guidance method of claim 1 wherein the portable electronic device is a near-field communication device.

3. The user guidance method of claim 1 including sending a command based on the route to at least one of an access control system and an elevator system control.

4. The user guidance method of claim 1 including reading the destination information from the tag at the starting area using the portable electronic device.

5. The user guidance method of claim 4 wherein the tag is one of a plurality of tags, and further selecting the tag based on a desired destination for the user.

6. The user guidance method of claim 1 including providing the directions to the user using a display connected to the guidance computer.

7. The user guidance method of claim 1 including providing the directions the user using a speaker connected to the guidance computer.

8. A user guidance system comprising:
a tag storing destination information for a destination, the tag being located in a starting area, the destination information identifying as the destination a particular location or type of location that a user wishes to reach;

a reader configured to read the destination information from a portable electronic device following presentation of the portable electronic device to the reader, the reader being separate from the portable electronic device, the portable electronic device having read the destination information from the tag upon selection of the tag by the user; and a guidance computer connected to the reader, the guidance computer configured to determine a route for the destination from a location of the reader and provide directions to enable a user to follow the route.

9. The user guidance system of claim 8 including an elevator control system connected to the reader, the reader being an elevator destination call terminal.

10. The user guidance system of claim 8 wherein the tag is a first tag and the destination is a first destination, and including a second tag storing destination information for a second destination.

11. The user guidance system of claim 8 wherein the tag is fixed to a wall at the starting area.

12. The user guidance system of claim 8 wherein the tag is fixed to a surface at the starting area other than a wall.

13. The user guidance system of claim 8 wherein the tag is a radio tag or an optical code.

14. The user guidance system of claim 8 wherein the destination information indicates a relative destination.

15. A non-transitory computer-readable storage media having encoded thereon instructions that, when executed by a computer, cause the computer to perform a method, the method comprising the steps of:

reading, using a reader, destination information for a destination from a portable electronic device following presentation of the portable electronic device to the reader, the destination information having been read by the portable electronic device from a tag selected by a user at a starting area, the reader being separate from the portable electronic device, the destination information identifying as the destination a particular location or type of location that the user wishes to reach;

determining, using a guidance computer, a route for the destination from a location of the reader; and providing directions to a user using the guidance computer to enable the user to follow the route, the guidance computer being separate from the portable electronic device.

16. The user guidance method of claim 1, wherein the directions include a direction in which the user should move.

17. The user guidance method of claim 1, wherein the directions include an elevator assignment.

18. The user guidance method of claim 1, wherein the directions include a door which the user should pass through.

* * * * *